Oct. 9, 1928.  1,686,788
W. L. BEAN
LOCOMOTIVE SMOKE BOX STRUCTURE
Filed June 2, 1925    2 Sheets-Sheet 1
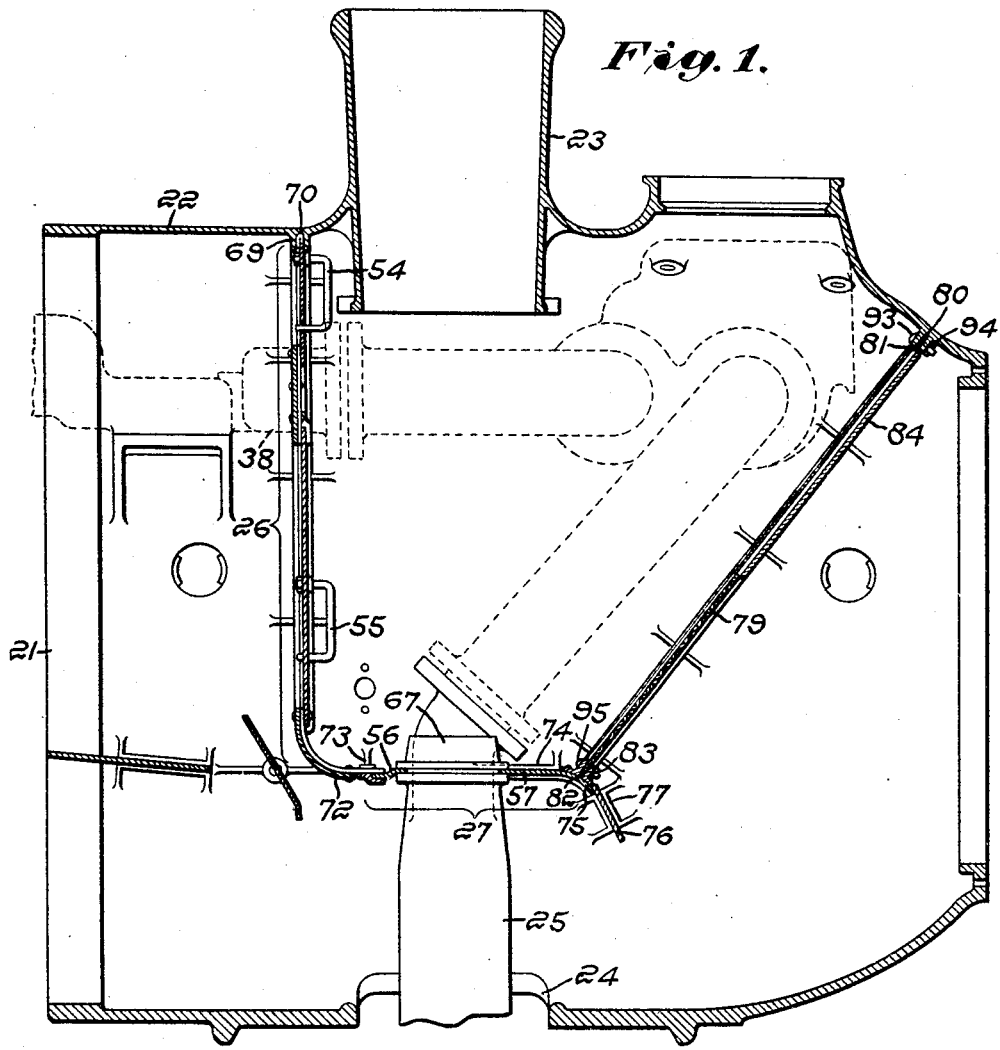
Inventor:
William L. Bean,

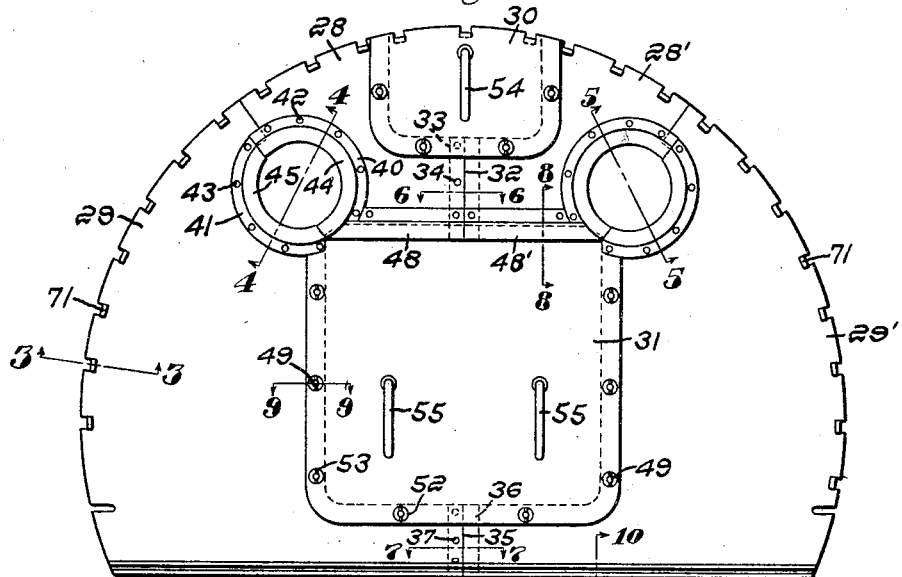
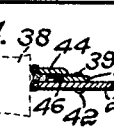
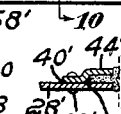
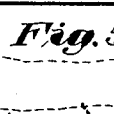
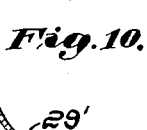
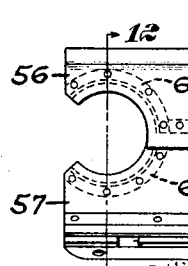
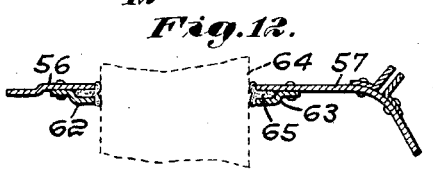

Patented Oct. 9, 1928.

1,686,788

UNITED STATES PATENT OFFICE.

WILLIAM L. BEAN, OF WEST HAVEN, CONNECTICUT.

LOCOMOTIVE-SMOKE-BOX STRUCTURE.

Application filed June 2, 1925. Serial No. 34,405.

This invention relates to locomotive smoke-box structures and has particular reference to novel features relating to deflectors.

The invention will be best understood by reference to the following description, when taken in connection with the accompanying drawings of one specific embodiment thereof while its scope will be more particularly pointed out in the appended claims.

In the drawings:

Fig. 1 is a longitudinal, vertical sectional view of a locomotive smoke-box structure exemplifying the invention;

Fig. 2 is a front elevation of a portion of the deflector;

Fig. 3 is a sectional view, on an enlarged scale, on line 3—3 of Fig. 2;

Fig. 4 is a sectional view, on an enlarged scale, on line 4—4 of Fig. 2;

Fig. 5 is a sectional view, on an enlarged scale, on line 5—5 of Fig. 2;

Fig. 6 is a sectional view, on an enlarged scale, on line 6—6 of Fig. 2;

Fig. 7 is a sectional view, on an enlarged scale, on line 7—7 of Fig 2.

Fig. 8 is a sectional view, on an enlarged scale, on line 8—8 of Fig. 2;

Fig. 9 is a sectional view, on an enlarged scale, on line 9—9 of Fig. 2;

Fig. 10 is a sectional view, on an enlarged scale, on line 10—10 of Fig. 2;

Fig. 11 is a plan of a portion of the deflector;

Fig 12 is a sectional view on an enlarged scale, on line 12—12 of Fig. 11;

Fig. 13 is a sectional view, on an enlarged scale, on line 13—13 of Fig. 11;

Referring to the drawings, and to the embodiment of the invention which is selected for exemplification, and having reference at first more particularly to Fig. 1, the smoke-box structure comprises a smoke-box 21, which in the present example is a casting having a circumferential wall 22 and a stack 23. The smoke-box presents an opening 24 for an exhaust pipe 25, the exhaust from which is directed upwardly into and through the stack, and thereby induces a draft in a well-known manner.

The deflector which deflects the gases in a downward direction and compels them to flow first to the forward end of the smoke-box, and thence in an upward and rearward direction through the spark netting into the path of the exhaust steam toward the stack, will now be described, reference being had at first to Fig. 1. The deflector comprises a rear, generally upright portion, designated generally by the numeral 26, and a lower, generally horizontal portion, designated generally by the numeral 27, each of which is composed of a plurality of sections, or plates, now to be described, reference being had at first to Fig. 2. The rear portion comprises upper left and right plates 28 and 28', lower left and right plates 29 and 29', an upper inspection plate 30, and a lower inspection plate 31. Herein, the plates 28 and 28' abut against each other along a line 32, and to ensure a tight joint at that point, there is secured to the adjacent margin of the plate 28 (see Fig. 6) a narrow strip or plate 33, which overlies the margins of the plates 28 and 28', it being conveniently secured to the former as by rivets 34. Thus there is provided a joint which prevents sparks from passing through, even though the plates should become warped to quite an extent. Similarly, the plates 29 and 29' abut against each other along a line 35, and secured to the adjacent margin of the plate 29 (see Fig. 7) is a narrow plate or strip 36, which overlies the adjacent margins of both of the plates 29 and 29', and is conveniently secured to the former, as by rivets 37.

The plates 28 and 29 are joined to each other about a pipe, herein a superheater pipe 38, and the plates 28' and 29' are joined to each other about another pipe, herein a superheater pipe 38', and to prevent leakage of gases at these points, there are provided packings 39 and 39' (see Figs. 4 and 5). Secured to the margins of the plates 28 and 29 are narrow strips or plates 40 and 41, as by rivets 42 and 43. These plates are provided with offset portions 44 and 45, which, together with the adjacent margins of the plates 28 and 29, present grooves 46 and 47 to receive the packing 39. Similarly, plates 40' and 41' are secured to the plates 28' and 29' by rivets 42' and 43', and the plates 40' and 41' have offset portions 44' and 45. These offset portions, together with the margins of the plates 28' and 29', form grooves 46' and 47' for the packing 39'. Similarly, there are secured to the lower margins of the plates 28 and 28' narrow strips or plates 48 and 48' (see Fig. 2), which are offset to provide grooves to receive the upper edge of the inspection plate 31 (see Fig. 8).

The inspection plate 31 may be conveniently secured in place by a series of fastening elements, one of which is illustrated in Fig. 9. In the present example, this fastening element is a pin 49, which is permanently secured to the plate 29 or 29', as the case may be, as by having a reduced portion 50, which extends through the plate and is riveted or headed over at 51. The body of the pin extends through the inspection plate 31, and receives at the front face of the latter a washer 52, conveniently held in place by a split locking key 53, which extends through the pin. Like fastening elements are employed for the upper inspection plate. The inspection plates may be provided with appropriate handles 54 and 55 (see Fig. 2).

The lower portion 27 of the deflector will now be described, reference being had at first to Fig. 11. Here, the deflector extends about the exhaust and live steam pipes, and to enable the deflector to be fitted about these pipes, it comprises two plates 56 and 57. The rear plate 56 has its rear marginal portion received in a groove presented by offset strips 58 and 58' (see Fig. 2), secured to adjacent edges of the plates 29 and 29'. One of these is shown in section in Fig. 10. At this point, it may be mentioned that the corner of the deflector (see Fig. 10) is preferably rounded on both sides. This form prevents eddy currents, and improves the draft by promoting a smoother flow of gases below, as well as above the deflector.

The plates 56 and 57 likewise have tongue and groove connection with each other, the plate 56 to this end having secured to its marginal portion narrow strips or plates 59 (see Fig. 13), having offset portions 60, which, together with the adjacent margin of the plate 56, present grooves to receive the margin of a plate 57, the latter in this example lying in the same plane as the plate 56, and having its marginal portion 61 offset to lie within the groove. Similar offset plates 62 and 63, secured to the plates 56 and 57 about live steam pipes 64, present grooves for packings 65 (see Fig. 12). These packings prevent leakage, and also prevent wearing of the pipes which might occur if they were to rub against the plates. Where the plates 56 and 57 are disposed about the exhaust pipe 25, they present an opening 66, which receives the exhaust pipe, and above this opening is provided a usual exhaust nozzle 67 (see Fig. 1), which is secured to the plates, as well as to the exhaust pipe, by bolts 68 (see Fig. 11). In this way, the plates are securely united with each other and with the exhaust pipe, the latter therefore serving as a pedestal to support the plates.

The remaining supports for the deflector will now be described, reference being had at first to Fig. 1. The rear deflector, which it will be remembered, is composed of the plates 28, 28', 29, 29', 30 and 31, has a circular marginal portion which has tongue and groove connection with the circumferential wall of the smoke-box, as by providing the latter with an integrally formed projection 69, which presents a groove 70, in which said marginal portion is received. This interengagement of the deflector and the smoke-box enables the several plates composing the deflector to be put in place, and securely held, without the necessity of employing any fastening elements, such as bolts, or the like. It follows that the removal of the deflector plates can be accomplished with greater facility. Inasmuch as the groove, being cast, is likely to be more or less variable in width, and because it would be inconvenient to make its width uniform, the deflector is so made that it can easily be fitted to the groove. To this end, in the present example, the circular marginal portion of the deflector is slit to provide tongues 71, one of which is well illustrated in Fig. 3, which are bent back to occupy positions offset from the plane of the plate, thereby providing at the several local points a thickness greater than that of the body of the plate. This total thickness should not be less than the greatest width of the groove. To prevent looseness of the deflector in the groove, it is desirable that the deflector should fit the same snugly. This can be accomplished most conveniently by grinding or filing the several tongues until the thickness at these points corresponds to the width of the groove. In this way, a snug fit can be had without the use of fastenings.

Referring now to Fig. 2, the several plates which compose the rear portion of the deflector are put in place by first introducing the left-hand plate 29, then the lower right-hand plate 29', then the upper left-hand plate 28, then the upper right-hand plate 28', and finally the inspection plates 30 and 31, which, by the way, lock the others in place.

Referring again to Fig. 1, the rounded lower portions of the deflector plates are supported by projections 72, herein formed as integral parts of the smoke-box casting. These projections are prolonged horizontally to afford support for the rear lower deflector plate 56. Upward movement of the rear corners of this plate is conveniently prevented by lugs 73, formed as integral projections from the circumferential wall of the smoke-box casting. The lower front plate 57 is conveniently supported by having its ends received in grooves presented by a projection 74, herein formed as integral parts of the smoke-box casting. The plate 57 is simply pushed horizontally into place, and is secured by the previously described bolts 68, which secure the exhaust nozzle to the exhaust pipe. Herein, the plate 57 has a depending marginal portion 75, to which is secured a damper plate 76, conveniently supported by grooves presented by projections 77 formed as integral parts of the smoke-box casting.

Having thus described one embodiment of the invention, but without limiting myself thereto, what I claim and desire by Letters Patent to secure is:

1. In a smoke-box structure, the combination of a smoke-box, a smoke stack and a deflector to deflect the gases and smoke on their way to said smoke stack, said deflector comprising a plate, means secured to said plate and presenting therewith a groove, and a part received in said groove.

2. In a smoke-box structure, the combination of a smoke-box, a smoke stack and a deflector to deflect the gases and smoke on their way to said smoke stack, said deflector comprising a plate, a strip secured to the margin of said plate and having an offset portion presenting with said plate a groove, and a part received in said groove.

3. In a smoke-box structure, the combination of a smoke-box a smoke stack and a deflector to deflect the gases and smoke on their way to said smoke stack said deflector comprising a plate, a strip secured to the margin of said plate and having an offset portion presenting with said plate a groove, and a plate having a marginal portion received in said groove.

4. In a smoke-box structure, the combination of a smoke-box, a smoke stack and a deflector to deflect the gases and smoke on their way to said smoke stack, said deflector comprising a plate, a strip secured to the margin of said plate and having an offset portion presenting with said plate a groove, and a plate having a marginal portion received in said groove and another portion which is offset and lies in the same plane as the first-mentioned plate.

5. In a smoke-box structure for locomotives, the combination of a smoke-box having a groove, a smoke stack and a deflector to deflect the gases and smoke on their way to said smoke stack, said deflector comprising a sheet metal plate having a thickness less than the width of said groove and having a marginal portion received in said groove and having a part bent to provide a thickness within said groove greater than the thickness of said plate.

6. In a smoke-box structure for locomotives, the combination of a smoke-box having a groove, a smoke stack, and a deflector to deflect the gases and smoke on their way to said smoke stack, said deflector comprising a sheet metal plate having a thickness less than the width of said groove and having a marginal portion received in said groove, said marginal portion having tongues which are bent to provide a thickness greater than that of said plate.

7. In a smoke-box structure for locomotives, the combination of a smoke-box having a groove, a smoke stack and a deflector to deflect the gases and smoke on their way to said smoke stack, said deflector comprising a sheet metal plate having having a thickness less than the width of said groove and having a marginal portion received in said groove, said marginal portion being slit to provide tongues which are bent to occupy offset positions.

8. In a smoke-box structure, the combination of a smoke-box, a smoke stack, and a deflector to deflect the gases and smoke on their way to said smoke stack, said deflector comprising a plate, a strip secured to one face of a marginal portion of said plate and projecting beyond the edge of the latter, and another plate lying in the same plane as the first-mentioned plate and having a marginal portion which overlies the projecting portion of said strip.

In testimony whereof, I have signed my name to this specification.

WILLIAM L. BEAN.